Feb. 4, 1930.   V. A. PENDLETON   1,745,556
REFRIGERATING ICE CREAM CONE DISPENSER
Filed Aug. 31, 1928
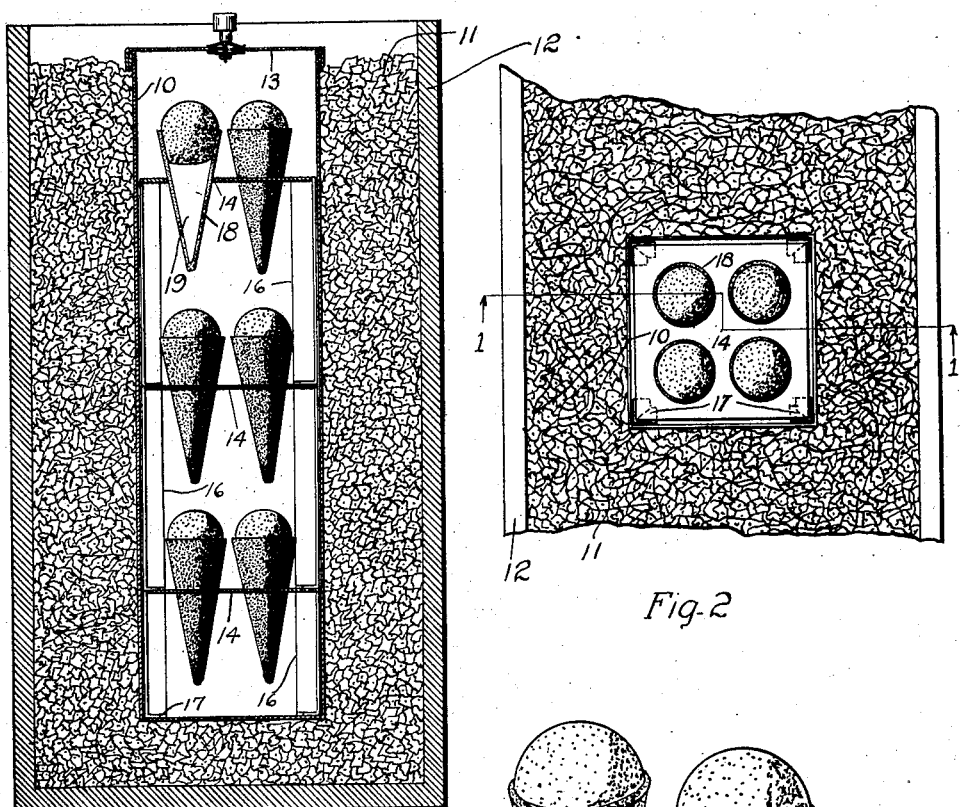
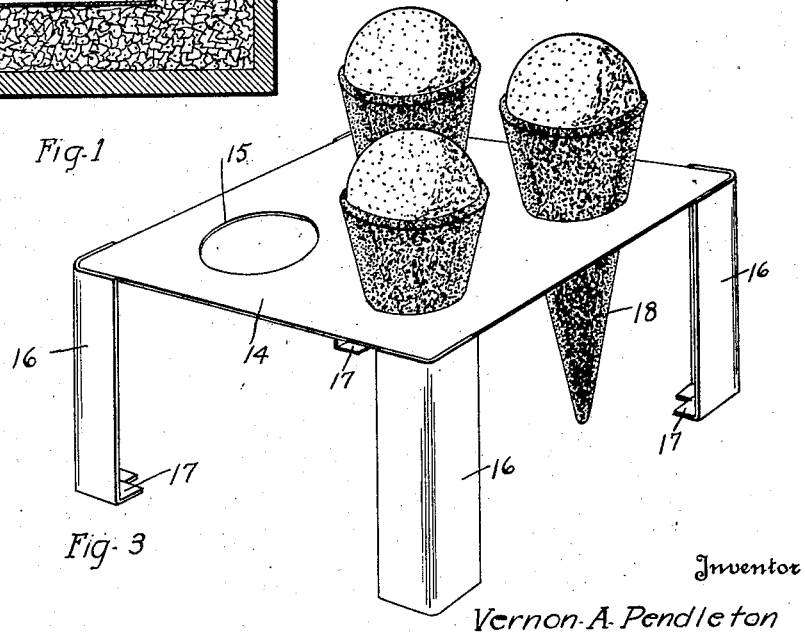
Inventor
Vernon A. Pendleton
By Bradbury & Caswell
Attorneys Patented Feb. 4, 1930

1,745,556

UNITED STATES PATENT OFFICE

VERNON A. PENDLETON, OF MINNEAPOLIS, MINNESOTA

REFRIGERATING ICE-CREAM-CONE DISPENSER

Application filed August 31, 1928. Serial No. 303,319.

This invention relates to a method and appliance for dispensing ice cream cones from a soda fountain or other place where such confections may be dispensed.

It is found, in dispensing confections of this character, consisting of a portion of ice cream inserted in a crisp edible container formed in the shape of a cone, that very often the ice cream contacting the comparatively warm cone melts so rapidly that it saturates the porous material of the cone and frequently oozes out from the bottom in case it is not completely closed. Furthermore it is found that the demand for these articles is usually greater at certain hours of the day, as at the noon hour, when the dispensing counter may be crowded with customers and it is difficult for the attendant to supply the demand quickly enough, whereas at other hours of the day, as immediately after lunch time, there may be very little business and the attendant has plenty of time at his disposal.

This invention contemplates to provide a method and means wherewith the attendant is enabled to make up any desired number of ice cream cones and compactly and conveniently store the same until required for dispensing. Furthermore this storing of the cones materially improves them in regard to the objection above noted, i. e. melting too rapidly while being consumed, and also keeps them in a more wholesome, sanitary condition.

The improvements as above outlined constitute the principal objects of the invention. The various further objects and advantages will more fully appear from the detailed descriptions and the features of novelty will be particularly pointed out in the claims.

In the drawing illustrating the invention, Fig. 1 is a sectional elevation of my improved appliance, the section being taken along lines 1—1 in Fig. 2; Fig. 2 is a fragmental plan view of the appliance with the lid of the container removed; Fig. 3 is a detailed perspective view on a larger scale, illustrating one of the racks.

Referring in detail to the drawing, my improved appliance comprises an elongated receptacle 10, preferably of rectangular section, adapted to be inserted into the brine or other cooling medium 11, within the chest 12. The mouth of the receptacle is closed by a cover 13 and located within the receptacle are a series of removable racks or trays 14. Each of these racks is formed with a body portion, which is pierced with a plurality of apertures 15, into each of which an ice cream cone may be inserted. I have illustrated a rack having four apertures, but it will be understood that any suitable number may be used. The body portion of this rack, which is of a form such as to fit the interior of the receptacle 10, is provided with a number of legs 16 about its perimeter, preferably one at each corner. These legs fit the interior corners of the receptacle and form guides therewith, so that when the racks are superimposed, one over another, the legs will clear the cones on the rack immediately underneath. These legs 16 are also preferably of angular cross section, as clearly appears from Figs. 2 and 3, and terminate in feet, 17, extending horizontally from the bottom of the legs and forming an extended surface which may rest securely upon the contacting lower support.

In using the improved appliance, the attendant places the container 10 into the brine or other cooling medium, and then makes up a number of cones and places them into the apertures 15 of the lowest rack member 14, preferably leaving one aperture 15 open so that he may readily grasp the rack, as by inserting a finger through the aperture 15, lower the rack into the receptacle 10 and place it at the bottom thereof. He may then insert an additional cone to fill the remaining aperture. He next repeats the operation with the succeeding rack and places it into the receptacle 10, where it will be properly positioned by the guiding legs 16 and will be supported upon the lower rack by the feet 17 resting on the same. When the container is filled, the cover 13 is placed thereon and is in readiness for use at any time when occasion may demand. When required for use, the cover 13 is removed, whereupon the cones may be quickly taken out and, when the top rack is emptied, it may be removed and then the cones from the lower rack may be dispensed, and so on.

When the container is filled it may, as a rule, be kept for some time in the cooling medium before being opened. The cones, therefore, will be thoroughly chilled and the edible portion 18, together with the enclosed air space 19 becomes so cooled that when the customer holds the same while eating the cone, the interior of the portion of the ice cream will be kept cool and there will be no tendency for the same to melt before the ice cream is consumed. The chilled air 19 within the cone together with the material of the cone itself, forms an insulating medium for the ice cream and helps to keep down the temperature about the same for the time required during the period when the ice cream is being consumed. As the cone is formed of a crisp, edible material, which is absorbent of liquid, and in many cases susceptible of being softened by rise in temperature, it will be readily seen that with my improved method the possibility of the cone losing its crispness or becoming soggy and permitting the melted ice cream to penetrate therethrough is avoided. Furthermore, in case the bottom of the cone is not completely sealed, there will be no tendency of liquid running therefrom, as is often experienced with cones dispensed in the ordinary method. My improved method and appliance for dispensing the ice cream cones, is also far more sanitary than the usual method because the cones are kept enclosed and chilled and there is no possibility of germs lodging or propagating thereon, as often happens where the cones are kept in the open air for convenience of accessibility required during rush hour dispensing.

It will be understood that a series of these receptacles 10 may be placed side by side in the brine chest, such as used in the usual types of soda fountain dispensing appliances, and so provision can be made for any reasonable rush demand which may be met with during the busy hours of the day.

Various modifications may be resorted to without departing from the spirit of the invention as defined in the appended claims.

Having thus described my invention, what I claim as new and desire to secure by Letters Patent is:

1. An ice cream cone dispensing appliance comprising an elongated container adapted to be inserted into a cooling medium, and a plurality of superimposed racks within said container and removable therefrom, each rack having a body portion formed with apertures for holding a number of ice cream cones, and a plurality of legs formed about the perimeter of said body portion and terminating, at their lower extremities, in feet adapted to rest upon the bottom of the container or upon the next lower rack, said legs forming guides engaging the interior walls of said container to position the feet clear of the cones on the rack beneath.

2. An ice cream cone dispensing appliance comprising an elongated rectangular container adapted to be inserted into a cooling medium, and a plurality of superimposed rectangular racks within said container and removable therefrom, each rack having a body portion formed with apertures for holding a number of ice cream cones, and a plurality of legs of angular cross section, formed at the corners of said body portion, said legs terminating in feet adapted to rest upon the next lower rack, said legs forming guides engaging the interior corners of the container to position the feet clear of the cones on the rack beneath.

3. An ice cream cone dispensing appliance comprising an elongated rectangular container adapted to be inserted into a cooling medium, and a plurality of superimposed rectangular racks within said container and removable therefrom, each rack having a body portion formed with apertures for holding a number of ice cream cones, and a plurality of legs of angular cross section, formed at the corners of said body portion, said legs having overturned horizontal portions adapted to rest upon the next lower rack, said legs forming guides engaging the interior corners of the container to position the feet clear of the cones on the rack beneath.

4. An ice cream cone dispensing appliance comprising an elongated container adapted to be inserted into a cooling medium, and a plurality of superimposed racks within said container and removable therefrom, each rack having a body portion formed with apertures for holding a number of ice cream cones, and a plurality of legs, issuing from said body portion, adapted to rest upon the bottom of the container, or upon the next lower rack, said legs forming guides engaging the interior walls of said container upon the insertion of a rack thereinto and, in turn, being guided by said walls of said container and thereby positioned clear of the cones on the rack beneath.

5. An ice cream cone dispensing appliance comprising an elongated container adapted to be inserted into a cooling medium, and a plurality of superimposed racks within said container and removable therefrom, each rack having a body portion formed with apertures for holding a number of ice cream cones, and a plurality of spacing members issuing from said body portion, adapted to engage the body portion of the adjacent rack, said spacing members forming guides engaging the interior walls of said container upon the insertion of a rack thereinto.

6. An ice cream dispensing appliance comprising an elongated container, open at the top thereof, adapted to be inserted into a cooling medium, a plurality of racks adapted to be passed, one after the other, into the container from the top thereof and disposed in superimposed relation within said container, each rack being adapted to receive and hold a number of ice cream cones in upright position, and means for supporting said racks and spacing the same apart within the container, said racks being removable in their order from said container through the open top thereof.

In testimony whereof I have affixed my signature to this specification.

VERNON A. PENDLETON.